United States Patent
Lu et al.

(10) Patent No.: US 11,012,225 B1
(45) Date of Patent: May 18, 2021

(54) SYNCHRONIZATION DETECTION METHOD FOR NR SIDELINK

(71) Applicant: Samsung Electronics Co., Ltd., Suwon-si (KR)

(72) Inventors: Sili Lu, San Diego, CA (US); Hongbing Cheng, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/017,500

(22) Filed: Sep. 10, 2020

Related U.S. Application Data

(60) Provisional application No. 63/017,922, filed on Apr. 30, 2020.

(51) Int. Cl.
*H04L 7/00* (2006.01)
*H04J 3/06* (2006.01)

(52) U.S. Cl.
CPC .................. *H04L 7/0033* (2013.01)

(58) Field of Classification Search
CPC .................................................. H04L 7/0033
USPC ....... 375/356, 362, 363, 364, 365, 366, 367, 375/368; 370/503, 510, 511, 512, 513, 370/514
See application file for complete search history.

(56) References Cited

U.S. PATENT DOCUMENTS

| | | | |
|---|---|---|---|
| 8,472,569 B2* | 6/2013 | Roh | H04L 27/2335 |
| | | | 375/343 |
| 8,576,810 B2 | 11/2013 | Yi | |
| 8,670,429 B2 | 3/2014 | Ancora et al. | |
| 9,166,718 B2 | 10/2015 | Chen et al. | |
| 9,544,083 B2 | 1/2017 | Reddy | |
| 10,306,673 B2 | 5/2019 | Zhang et al. | |
| 2013/0329721 A1 | 12/2013 | Doetsch et al. | |
| 2018/0279245 A1* | 9/2018 | Yu | H04W 56/004 |

OTHER PUBLICATIONS

Yu Li et al., "A Joint Low-Power Cell Search and Frequency Tracking Scheme in NB-IoT Systems for Green Internet of Things", 2018, Source http://www.mdpi.com/journal/sensors, retrieved on Jan. 1, 2020, pp. 1-22.*

(Continued)

*Primary Examiner* — Tesfaldet Bocure
(74) *Attorney, Agent, or Firm* — Lewis Roca Rothgerber Christie LLP

(57) ABSTRACT

A synchronization detection method for new radio (NR) sidelink. In some embodiments, the method includes calculating a first delay compensated input signal, calculating a first correlation value, calculating a first correlation power, calculating a first weighted correlation power, and detecting a synchronization signal. The first delay compensated input signal may be based on an input signal, and an index of a first tap value. The first correlation value may be based on a first candidate sequence and the first delay compensated input signal. The first correlation power may be based on the first correlation value. The first weighted correlation power may be based on a first weighting factor, and the first correlation power. The detecting of the synchronization signal may include using the first weighted correlation power.

20 Claims, 5 Drawing Sheets

(56) References Cited

OTHER PUBLICATIONS

Cohn, M et al., "On Fast M-Sequence Transforms", IEEE Transactions on Information Theory, Jan. 1977, pp. 135-137, IEEE.
Morelli, M. et al., "A Maximum Likelihood Approach for SSS Detection in LTE Systems", IEEE Transactions on Wireless Communications, Apr. 2017, pp. 2423-2433, vol. 16, No. 4, IEEE.
Naik, G. et al., "IEEE 802.11bd & 5G NR V2X: Evolution of Radio Access Technologies for V2X Communications", IEEE Access, May 27, 2019, pp. 70169-70184, vol. 7, IEEE.

\* cited by examiner

SYNCHRONIZATION DETECTION METHOD FOR NR SIDELINK

CROSS-REFERENCE TO RELATED APPLICATION(S)

The present application claims priority to and the benefit of U.S. Provisional Application No. 63/017,922, filed Apr. 30, 2020, entitled "MAXIMUM LIKELIHOOD BASED NR SIDELINK SSS SEARCHER METHOD", the entire content of which is incorporated herein by reference.

FIELD

One or more aspects of embodiments according to the present disclosure relate to new radio, and more particularly to a system and method for new radio sidelink synchronization symbol detection.

BACKGROUND

In new radio sidelink communications, synchronization signals consisting of sidelink primary and secondary synchronization signals (S-PSS and S-SSS) are transmitted periodically from the transmitting user device (UE) to the receiving UE(s). The receiving UE may detect the synchronization signal and synchronize to the side link channel. Performing synchronization in a manner that is both robust and low-cost (i.e., feasible using the processing capability of a UE) may be challenging.

Thus, there is a need for an improved system and method for new radio sidelink synchronization symbol detection.

SUMMARY

According to an embodiment of the present invention, there is provided a method, including: calculating a first delay compensated input signal, the first delay compensated input signal being based on: an input signal; and an index of a first tap value; calculating a first correlation value, the first correlation value being based on: a first candidate sequence, and the first delay compensated input signal; calculating a first correlation power, the first correlation power being based on the first correlation value; calculating a first weighted correlation power, the first weighted correlation power being based on: a first weighting factor, and the first correlation power; and detecting a synchronization signal, using the first weighted correlation power.

In some embodiments, the first delay compensated input signal is based on a unit magnitude complex function having a phase proportional to: time, and the index of the first tap value.

In some embodiments, the first delay compensated input signal is proportional to: the unit magnitude complex function, and the input signal.

In some embodiments, the calculating of the first correlation value includes calculating a dot product of: the first candidate sequence, and the first delay compensated input signal.

In some embodiments, the first correlation power is further based on the first tap value.

In some embodiments, the calculating of the first correlation power includes calculating the square of the magnitude of the sum of the first correlation value and the first tap value.

In some embodiments, the method further includes calculating the first weighting factor as the ratio of: the squared magnitude of the first tap value, to the sum of: the squared magnitude of the first tap value, and a noise variance.

In some embodiments, the method further includes: calculating a second delay compensated input signal, the second delay compensated input signal being based on: the input signal; and an index of a second tap value; calculating a second correlation value, the second correlation value being based on: the first candidate sequence, and the second delay compensated input signal; calculating a second correlation power, the second correlation power being based on the second correlation value; and calculating a second weighted correlation power, the second weighted correlation power being based on: a second weighting factor, and the second correlation power.

In some embodiments: the first tap value is greater in magnitude than a third tap value, and the second tap value is greater in magnitude than the third tap value.

In some embodiments, the first candidate sequence is a new radio sidelink secondary synchronization signal.

In some embodiments, the method further includes calculating the input signal, the calculating of the input signal including calculating a coherent combination of two sidelink secondary synchronization signals.

According to an embodiment of the present invention, there is provided a user device, including a processing circuit, the processing circuit being configured to: calculate a first delay compensated input signal, the first delay compensated input signal being based on: an input signal; and an index of a first tap value; calculate a first correlation value, the first correlation value being based on: a first candidate sequence, and the first delay compensated input signal; calculate a first correlation power, the first correlation power being based on the first correlation value; calculate a first weighted correlation power, the first weighted correlation power being based on: a first weighting factor, and the first correlation power; and detect a synchronization signal, using the first weighted correlation power.

In some embodiments, the first delay compensated input signal is based on a unit magnitude complex function having a phase proportional to: time, and the index of the first tap value.

In some embodiments, the first delay compensated input signal is proportional to: the unit magnitude complex function, and the input signal.

In some embodiments, the calculating of the first correlation value includes calculating a dot product of: the first candidate sequence, and the first delay compensated input signal.

In some embodiments, the first correlation power is further based on the first tap value.

In some embodiments, the calculating of the first correlation power includes calculating the square of the magnitude of the sum of the first correlation value and the first tap value.

In some embodiments, the first candidate sequence is a new radio sidelink secondary synchronization signal.

In some embodiments, the processing circuit is further configured to calculate the input signal, the calculating of the input signal including calculating a coherent combination of two sidelink secondary synchronization signals.

According to an embodiment of the present invention, there is provided a system, including a means for processing, the means for processing being configured to: calculate a first delay compensated input signal, the first delay compensated input signal being based on: an input signal; and an index of a first tap value; calculate a first correlation value, the first correlation value being based on: a first candidate sequence, and the first delay compensated input signal; calculate a first correlation power, the first correlation power being based on the first correlation value; calculate a first weighted correlation power, the first weighted correlation power being based on: a first weighting factor, and the first correlation power; and detect a synchronization signal, using the first weighted correlation power.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for new radio sidelink synchronization symbol detection provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
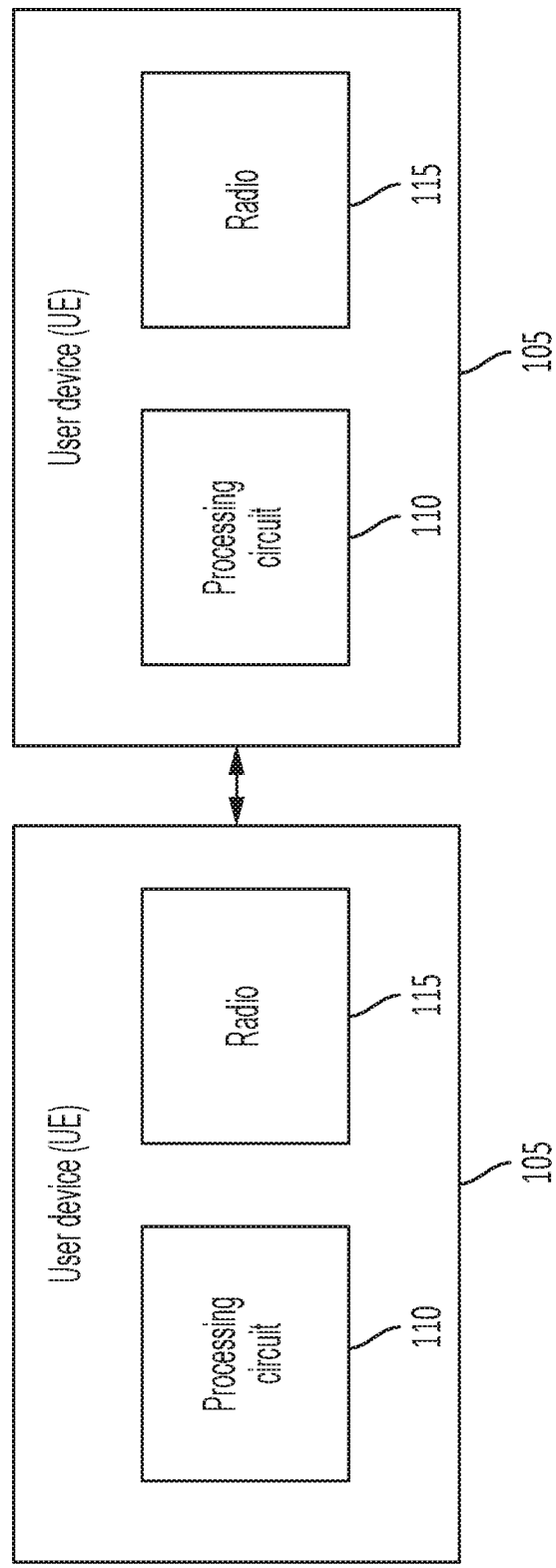
FIG. 1 is a block diagram of two user devices, according to an embodiment of the present disclosure.

FIG. 1 shows two user devices 105 configured to be connected by a new radio sidelink connection. Each user device (UE) (or "user equipment") includes a processing circuit 110 (discussed in further detail below) which may set up a sidelink connection with the other UE through the radios 115 of the UEs 105. In the new radio (NR) sidelink cell search process, a user device detects the sidelink primary synchronization signal (S-PSS) and the sidelink secondary synchronization signal (S-SSS) so that it can obtain knowledge of the cell identifier (ID), and so that it may synchronize data being exchanged with another UE. The sidelink synchronization signal block (S-SSB), contains a pair of identical S-PSS symbols on symbol 1 and 2 in the slot, followed by a pair of identical S-SSS symbols on symbol 3 and 4. A UE may detect the S-PSS and obtain the S-PSS ID, and then search for the S-SSS.

Some embodiments are based on a system model consisting of these four consecutive symbols, whose channel impulse responses are denoted by $h_1$, $h_2$, $h_3$ and $h_4$. Each channel impulse response (CIR) vector is assumed to have L non-zero taps $h_i=[h_i(0), h_i(1), \ldots, h_i(L-1), 0, \ldots, 0]^T$. The size of $h_i$ is N×1 where N is the FFT/IFFT size, which may depend on the sampling rate of the S-PSS and S-SSS signals.

The channel frequency responses (CFRs) of the two S-PSS symbols can be obtained by descrambling the received symbols with the detected S-PSS reference sequence. The descrambled S-PSS signals may be denoted as $$y_{p,1}=Fh_1+w_{p,1}$$

$$y_{p,2}=Fh_2+w_{p,2}$$

where $y_{p,1}$ and $y_{p,2}$ are descrambled output vectors for the first and second S-PSS symbols, respectively, and $w_{p,1}$ and $w_{p,2}$ are the corresponding noise vectors, respectively, each of which has a size of 127 x1. F is a 127×N matrix whose rows are extracted from the N×N FFT matrix corresponding to the S-PSS subcarrier (SC) locations. The signals $y_{p,1}$ and $y_{p,2}$ may be computed by descrambling with the S-PSS signal detected.

For the pair of S-SSS symbols, the frequency domain (FD) received signals may be written as $$y_{s,1}=D_aFh_3+w_{s,1}$$

$$y_{s,2}=D_aFh_4+w_{s,2}$$

where $y_{s,1}$, $y_{s,2}$, $w_{s,1}$ and $w_{s,2}$ are the frequency domain received vectors for the first and second S-SSS symbols, and the corresponding noise vectors, respectively, each of which has a size of 127×1. $D_a=\text{diag}([D_a(0), \ldots D_a(126)])$ is a diagonal matrix whose diagonal is the a-th S-SSS reference sequence.

Stacking the above equations, the system model may be written as $$y = \begin{Bmatrix} Fh_1 \\ Fh_2 \\ D_aFh_3 \\ D_aFh_4 \end{Bmatrix} + w$$

where $y=[y_{p,1}^T y_{p,2}^T y_{s,1}^T y_{s,2}^T]^T$ and $w=[w_{p,1}^T w_{p,2}^T w_{s,1}^T w_{s,2}^T]^T$. Some embodiments employ a simplified maximum likelihood (ML) solution over candidate S-SSS sequences, (each candidate S-SSS sequence being identified by a respective value of the index a), based on the system model shown above.

Some embodiments employ an ML-based approach for a new radio sidelink S-SSS searcher, which is optimal under different Doppler scenarios. This approach may be modified with practical adjustments to make implementation possible. Further, the ML method may be simplified to two reduced-complexity approaches to be implanted in high or low Doppler scenarios, respectively. The methods that result may, in some embodiments, be extended to other systems such as NR downlink and more general cases.

The two identical S-SSS symbols may be selected from a set of 336 candidate sequences (or "reference sequences"). A cost function for a maximum likelihood (ML) detection method, over the S-SSS candidate reference sequence index a (ranging, e.g., from 0 to 335) may be expressed as $$\Phi(a)=v_{s,1}^H(a)G_0v_{s,1}(a)+v_{s,2}^H(a)G_1v_{s,2}(a)+$$
$$2\text{Re}\{v_{s,1}^H(a)G_3v_{s,2}(a)+v_{p,2}^HG_2v_{s,1}(a)+$$
$$v_{p,1}^HG_4v_{s,1}(a)+v_{p,2}^HG_4v_{s,2}(a)+v_{p,1}^HG_5v_{s,2}(a)\}$$

where $v_{s,k}(a)=F^HD_ay_{s,k}$ and $v_{p,k}=F^Hy_{p,k}$ for k=1, 2 and the $G_i$'s are diagonal matrices of size N×N (discussed in further detail below). The ML detection is obtained by locating the maximum of $\Phi(a)$ over the 336 candidate a values, yielding $$(\hat{a})_{ML}=\arg\max_a\Phi(a)$$

The $G_i$'s in the equation above depend on the channel covariance matrix of size N×N as $C_h=E\{h_ih_i^H\}$ and on the Doppler frequency, which may be difficult to measure reliably in a real system. As such, practical adjustments, such as those listed below, may be made to the equations.

First, the channel covariance matrix is a diagonal matrix with the diagonal containing the power delay profile (PDP) of the channel. This matrix may be replaced with a diagonal matrix given by $C_{\hat{h}}=\mathrm{diag}([|\hat{h}(0)|^2, |\hat{h}(1)|^2, \ldots, |\hat{h}(L-1)|^2, 0, \ldots, 0])$ where $\hat{h}(n)$ is the n-th sample of the estimated channel impulse response (CIR) (estimated using S-PSS symbols).

Second, Doppler frequency $f_D$ is related to UE speed. As such, a correlation factor based on maximum expected vehicle speed $v_{max}$ may be used; and the Doppler frequency may be replaced with $\hat{f}_D=v_{max}f_0/c$. For a relative vehicle speed of 450 km/h (e.g. two UEs moving at 225 km/h toward each other), at a carrier frequency of $f_0$=3.6 GHz, the Doppler frequency is approximately 1.5 kHz.

The complexity of finding a maximum likelihood solution may be reduced in various ways. For example, a UE may select either a solution based on an infinite Doppler approximation or a solution based on a zero Doppler approximation depending on the fading environment. These solutions may achieve detection performance similar to the full complexity ML detection, at significantly lower cost.

In a solution based on an infinite Doppler approximation, the cost function is reduced to $\tilde{\Phi}(a)=v_{s,1}^H(a)Pv_{s,1}(a)+v_{s,2}^H(a)Pv_{s,1}(a)$, where $P=(\sigma^2 C_{\hat{h}}^{-1}+I_N)^{-1}$ and $\sigma^2$ is the noise variance. Based on this cost function, a reduced CIR tap approach, which can be implemented with an efficient fast Hadamard transform (FHT) operation, may be used. This approach may be employed in a high Doppler scenario when the UE is moving at high speed (as discussed in further detail below).

A solution based on a zero Doppler approximation may be suitable for a low Doppler scenario, in which case the cost function becomes $\tilde{\Phi}(a)=(v_{s,1}^H(a)+v_{s,2}^H(a)+v_{p,1}^H+v_{p,2}^H)P(v_{s,1}(a)+v_{s,2}(a)+v_{p,1}+v_{p,2})$. This method may also be practiced with a reduced CIR tap approach (discussed in further detail below).

In some embodiments, a maximum likelihood solution, and approximate maximum likelihood solutions may be derived as follows. Assuming the noise vector w is statistically independent of the CIR vectors, it follows that the observation vector y is complex Gaussian distributed with zero-mean and covariance matrix given by $C_y(a)=Q(a)RQ^H(a)+\sigma^2 I_{508}$, where $Q(a)$ is a matrix of size 508×4N given by $$Q(a) = \begin{pmatrix} F & 0 & 0 & 0 \\ 0 & F & 0 & 0 \\ 0 & 0 & D_aF & 0 \\ 0 & 0 & 0 & D_aF \end{pmatrix}$$

and matrix $R=A\otimes C_h$ of size 4N×4N is the Kronecker product matrix of the time domain (TD) symbol correlation matrix A and the diagonal matrix $C_h$. The correlation matrix A is given by $$A = \begin{pmatrix} 1 & \alpha_1 & \alpha_2 & \alpha_3 \\ \alpha_1 & 1 & \alpha_1 & \alpha_2 \\ \alpha_2 & \alpha_1 & 1 & \alpha_1 \\ \alpha_3 & \alpha_2 & \alpha_1 & 1 \end{pmatrix}$$

where $a_k=J_0(2\pi k f_D T_B)$ is the correlation factor assuming Jake's isotropic scattering model. $f_D$ and $T_B$ are the maximum Doppler frequency and symbol duration, respectively, and $J_0(x)$ is the zero-th order Bessel function of the first kind. The eigenvalue decomposition of A may be denoted as $A=U\Lambda U^T$, where $\Lambda=\mathrm{diag}([\lambda_1, \lambda_2, \lambda_3, \lambda_4])$ is a diagonal matrix with eigenvalues. The observation vector y has a multivariate Gaussian distribution $$p(y \mid a) = \frac{1}{(2\pi)^{\frac{508}{2}}(\det C_y(a))^{\frac{1}{2}}}\exp\left(-\frac{1}{2}y^H C_y^{-1}(a)y\right)$$

Taking the logarithm operation of the above equation, the log-likelihood function (LLF) for the detection of a may be written as $$\Omega(a)=\ln \det C_y(a)-y^H C_y^{-1}(a)y$$

The first term in the equation above can be shown to be independent of a, and may therefore be dropped from the LLF calculation. Hence, the LLF cost function can be simplified to $$\Omega'(a)=-y^H C_y^{-1}(a)y$$

After some manipulation and dropping of irrelevant terms, the LLF function may be expressed as $$\Phi(a)=v_{s,1}^H(a)G_0 v_{s,1}(a)+v_{s,2}^H(a)G_1 v_{s,2}(a)+ 2\,\mathrm{Re}\{v_{s,1}^H(a)G_3 v_{s,2}(a)+v_{p,2}^H G_2 v_{s,1}(a)+ v_{p,1}^H G_4 v_{s,1}(a)+v_{p,2}^H G_4 v_{s,2}(a)+v_{p,1}^H G_5 v_{s,2}(a)\}$$

which is the equation for the ML cost function given above. Here, the $G_i$ can be computed as $$G_0 = \sum_{i=1}^{4} U(2,i)^2 C_i$$

$$G_1 = \sum_{i=1}^{4} U(1,i)^2 C_i$$

$$G_2 = \sum_{i=1}^{4} U(2,i)U(3,i) C_i$$

$$G_3 = \sum_{i=1}^{4} U(1,i)U(2,i) C_i$$

$$G_4 = \sum_{i=1}^{4} U(1,i)U(3,i) C_i$$

$$G_5 = \sum_{i=1}^{4} U(1,i)U(4,i) C_i$$

where $$c_i = \left(\frac{\sigma^2}{\lambda_i}C_h^{-1}+I_N\right)^{-1},$$

where $\lambda_i$ is the i-th element of the diagonal of $\Lambda$ and $U(j, i)$ is the (j, i)-th element of U.

A first reduced complexity method, using a maximum likelihood approach with an infinite Doppler approximation, may then be derived as follows. This approach assumes infinite Doppler frequency in which case the time domain symbol correlation matrix A becomes an identity matrix of order 4. In this case, only the first two terms of the cost function remain and the cost function is reduced to $$\Phi(a) = v_{s,1}^H(a)Pv_{s,1}(a) + v_{s,2}^H(a)Pv_{s,1}(a)$$

$$= y_{s,1}^H D_a^H FPF^H D_a y_{s,1} + y_{s,2}^H D_a^H FPF^H D_a y_{s,2}$$

Here P is a diagonal matrix whose k-th diagonal element is $$P(k) = \frac{|\hat{h}(k)|^2}{|\hat{h}(k)|^2 + \sigma^2}.$$

In order to simplify the complexity and share the hardware as much as possible with the second reduced complexity approach (which uses a zero Doppler approximation, as discussed in further detail below), a different form of the above equation may be implemented as $$\tilde{\Phi}'(a) = y_s^H D_a^H FPF^H D_a y_s$$

where $y_s = y_{s,1} + y_{s,2}$. The two equations are mathematically not the same, but it may be verified by simulation that the detection performance is similar. The above equation may be expressed in summation form as $$\tilde{\Phi}'(a) = \sum_{k=0}^{N-1} P(k) \cdot \left( \left| \sum_{n=0}^{126} D_a(n) \tilde{y}_{s,k}(n) \right|^2 \right)$$

where $$\tilde{y}_{s,k}(n) = y_s(n) e^{j\frac{2\pi k g(n)}{N}}$$

and g(n) is the SC index of the n-th sample of S-SSS sequence. For each k-th tap, the method may calculate the inner product between the a-th reference signal $[D_a(0), \ldots D_a(126)]^T$ and the modified receive signal vector $\tilde{y}_{s,k}$ whose n-th element is $\tilde{y}_{s,k}(n)$. The inner product between a-th reference signal (for a=0 to 335) and $\tilde{y}_{s,k}$ can be efficiently calculated by a fast Hadamard transform (FHT) operation, which involves a multiplication between a 128×128 Hadamard matrix and a 128×1 vector and two permutation operations.

The diagonal of P may be a sparse vector where most taps have energy close to zero. As such, it may be possible to limit the size of the summation in the equation above to a few dominant taps, which may significantly reduce the computation complexity. A corresponding method may include the following steps, illustrated in FIG. 2A.

Step 1: Coherently combine, at 200, the two received S-SSS symbols: $y_s = y_{s,1} + y_{s,2}$.

Figure 2A:
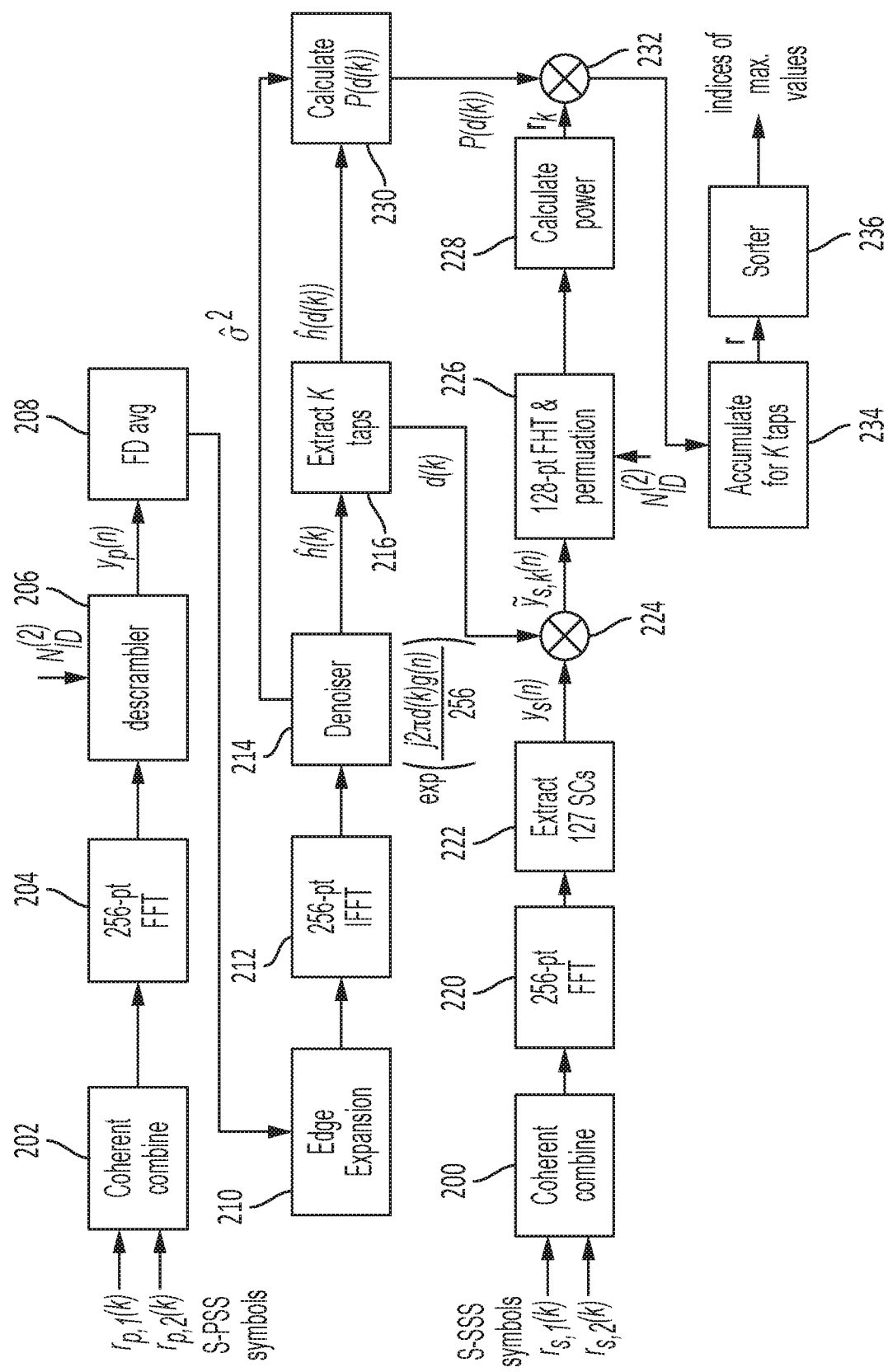
FIG. 2A is a block diagram of a system for performing maximum likelihood detection, according to an embodiment of the present disclosure.

Step 2: Obtain the channel impulse response h(n) from the coherently combined S-PSS symbols, pick K dominant taps $\{\hat{h}(d(1)), \ldots, \hat{h}(d(K))\}$ on indices $\{d(1), \ldots, d(K)\}$, and calculate P(d(k)). In FIG. 2A, this occurs as follows. At 202, the S-PSS symbols are coherently combined; at 204, a fast Fourier transform (FFT) is performed; at 206 descrambling is performed; at 208, a frequency domain (FD) average is calculated; at 210, edge expansion is performed; at 212, an inverse fast Fourier transform (IFFT) is performed; and at 214, a denoiser calculates the noise variance and also sets to zero each tap having a magnitude less than a threshold (the threshold being based on, e.g., proportional to, the noise variance). The K dominant taps are selected at 216.

Step 3: For each k∈{1, 2, ..., k}, (i.e., for each of the dominant taps) do the following:

Sub-step 3-1: Transform the signal $y_s$ to a "delay compensated input signal" $\tilde{y}_{s,k}$ by calculating $$\tilde{y}_{s,k}(n) = y_s(n) e^{j\frac{2\pi k g(n)}{N}}$$

where g(n) (which is proportional to time) is the subcarrier index of the n-th sample of the S-SSS sequence and each d(k) is an index of a "tap value" $\hat{h}(d(K))$. This can be implemented by a mixer operation. In FIG. 2A, after the two received S-SSS symbols are coherently combined at 200, a fast Fourier transform (FFT) is performed, at 220; at 222, the subcarriers (e.g., the 127 subcarriers) are extracted to match the S-SSS reference signal location in the frequency-domain (FD), and form the FD input signal; and, at 224, an input signal is multiplied by the delay compensated input signal.

Sub-step 3-2: Calculate a "correlation value" that is a measure of the correlation between the delay compensated input signal and a candidate sequence of the 336 reference sequences. For example, the correlation value may be calculated as the inner product between $\tilde{y}_{s,k}$ and the 336 reference sequences indexed by a. This calculation may be efficiently implemented using an FHT operation (e.g., by calculating the FHT of $\tilde{y}_{s,k}$). The result of this calculation may be a complex output vector of size 336×1.

Sub-step 3-3: Take the element-wise power of the output vector in sub-step 3-2. The output vector, each element of which may be referred to as a "correlation power", may be denoted $r_k$. In FIG. 2A, the calculation of the correlation is performed at 226, and the power is calculated at 228.

Step 4: Combine these K vectors by calculating $$r = \sum_{k=1}^{K} P(d(k)) r_k.$$

Each of the P(d(k)) (which are calculated at 230, in FIG. 2A) may be referred to as a "weighting factor". In FIG. 2A, the product of the power and the weighting factor is calculated at 232, and the sum is calculated at 234.

Step 5: Perform a sorting operation (at 236, in FIG. 2A) on vector r to pick the maximum m elements and report them as the detected S-SSS sequence candidates.

This approach is suited for a high Doppler scenario in which the UE is experiencing a fast fading channel.

A second reduced complexity method, using a maximum likelihood approach with a zero Doppler approximation, may be derived as follows. This approach assumes zero Doppler frequency in which case the time domain symbol correlation matrix A becomes an all-one matrix. In this case, the cost function becomes $$\tilde{\Phi}'(a) = (v_{s,1}^H(a) + v_{s,2}^H(a) + v_{p,1}^H + v_{p,2}^H) P(v_{s,1}(a) + v_{s,2}(a) + v_{p,1} + v_{p,2})$$

$$= (y_s^H D_a^H + y_p^H) FPF^H (D_a y_s + y_p)$$

where $y_p=y_{p,1}+y_{p,2}$. This cost function may be rewritten in summation form as $$\Phi'(a) = \sum_{k=0}^{N-1} P(k)\left|\sum_{n=0}^{126}(y_s(n)D_a(n)+y_p(n))\exp\left(\frac{j2\pi kn}{N}\right)\right|^2$$

$$= \sum_{k=0}^{N-1} P(k)\left|\sum_{n=0}^{126}(y_s(n)D_a(n)+y_p(n))\exp\left(\frac{j2\pi kn}{N}\right)+\sum_{n=0}^{126}y_p(n)\exp\left(\frac{j2\pi kn}{N}\right)\right|^2$$

The first term in the power operation (i.e. the first summation over n) is the correlation between modified S-SSS signal $$y_s(n)\exp\left(\frac{j2\pi kn}{N}\right)$$

with reference signal $D_a(n)$, which can be implemented using an FHT. The second term in the power operation is the inverse fast Fourier transform (IFFT) of $y_p(n)$ which is the kth tap of the estimated CIR in the time domain. As such, this operation may be implemented using the same procedures as those of the first reduced complexity method, with relatively minor changes. To adapt the sequence of steps listed above (for the first reduced complexity method) to the second reduced complexity method, Step 3 may be modified by adding an estimated CIR tap on sample d(k) to the vector before calculating the power (in sub-step 3-3). The steps for the second reduced complexity method are summarized below, with the changes being made to sub-step 3-3.

Step 1: Coherently combine the two received S-SSS symbols: $y_s=y_{s,1}+y_{s,2}$.

Step 2: Obtain channel $\hat{h}(n)$ from coherently combined S-PSS symbols, pick K dominant taps $\{\hat{h}(d(1)), \ldots, \hat{h}(d(K))\}$ on indices $\{d(1), \ldots, d(K)\}$, and calculate P(d(k)).

Step 3: For each $k \in \{1, 2, \ldots, K\}$, do the following:

Sub-step 3-1: Transform the signal $y_s$ to $\tilde{y}_{s,k}$ by calculating $$\tilde{y}_{s,k}(n) = y_s(n)e^{-j\frac{2\pi d(k)g(n)}{N}},$$

where g (n) is the subcarrier index of the n-th sample of S-SSS sequence. This can be implemented by a mixer operation.

Sub-step 3-2: Calculate the inner product between $\tilde{y}_{s,k}$ and the 336 reference sequences indexed by a. This calculation may be efficiently implemented using an FHT operation. The result of this calculation may be a complex output vector of size 336×1.

Sub-step 3-3: Add a scalar $\hat{h}(d(k))$ (at 240, in FIG. 2B) to the output vector in sub-step 3-2 and then take the element-wise power. The output vector may be denoted $r_k$.

Step 4: Combine these K vectors by calculating $$r = \sum_{k=1}^{K} P(d(k))r_k.$$

Step 5: Perform a sorting operation on vector r to pick the maximum m elements and report them as the detected S-SSS sequence candidates.

Figure 2B:
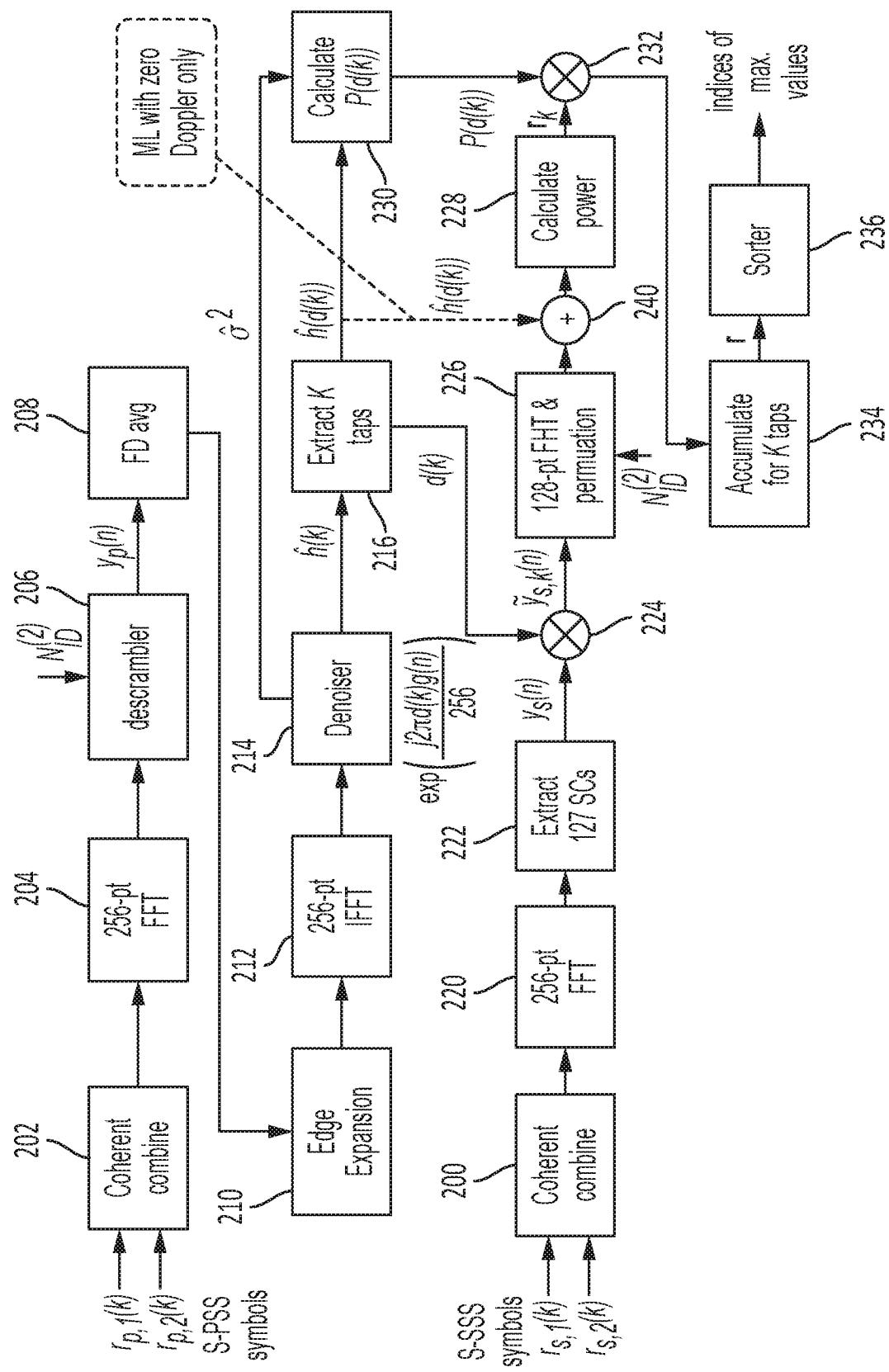
FIG. 2B is a block diagram of a system for performing maximum likelihood detection, according to an embodiment of the present disclosure.

The block diagram for the second reduced complexity method is shown in FIG. 2B, and is similar to that of the first reduced complexity method (FIG. 2A), with the method of FIG. 2B including the extra step of adding a CIR tap.

Figure 2C:
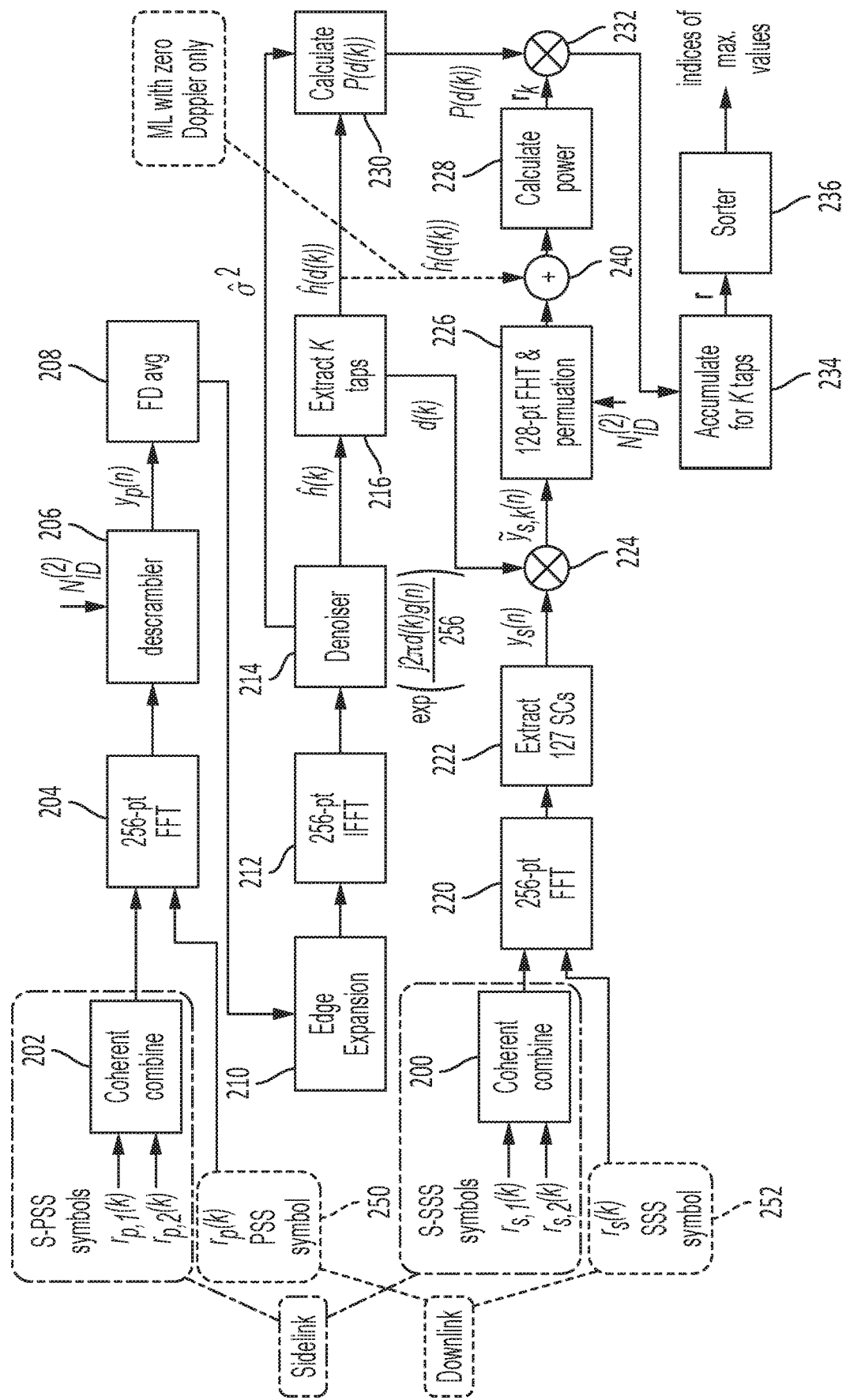
FIG. 2C is a block diagram of a system for performing maximum likelihood detection, according to an embodiment of the present disclosure.

FIG. 2C shows a version of the block diagram that may also be suitable for detecting downlink synchronization symbols. In this embodiment the coherent combination blocks 200 and 202 may be bypassed, with the symbols being instead received by single-symbol reception blocks 250, 252.

Figure 3:
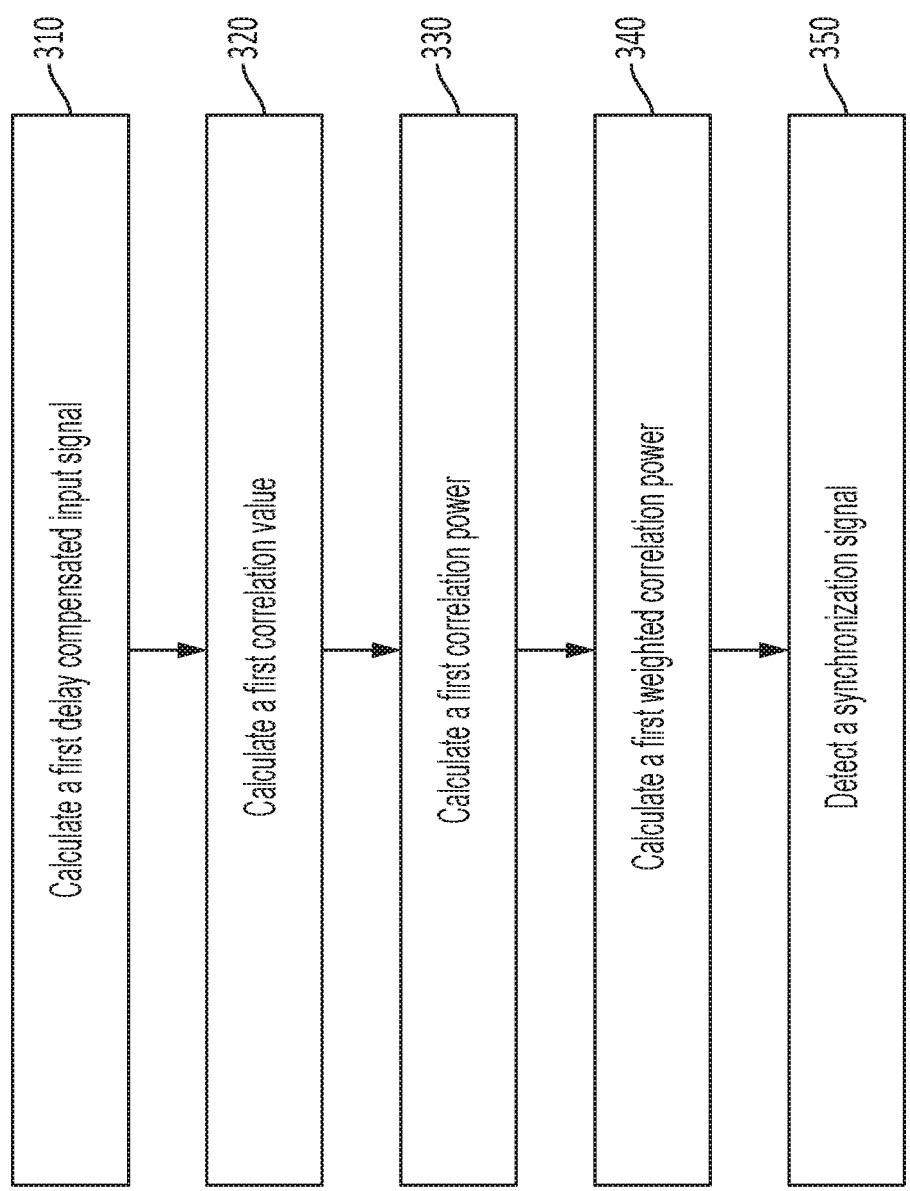
FIG. 3 is a flow chart, according to an embodiment of the present disclosure.

FIG. 3 is a flow chart, according to some embodiments. In some embodiments, there is provided a method, including: calculating, at 310, a first delay compensated input signal, the first delay compensated input signal being based on: an input signal; and an index of a first tap value; calculating, at 320, a first correlation value, the first correlation value being based on: a first candidate sequence, and the first delay compensated input signal; calculating, at 330, a first correlation power, the first correlation power being based on the first correlation value; calculating, at 340, a first weighted correlation power, the first weighted correlation power being based on: a first weighting factor, and the first correlation power; and detecting, at 350, a synchronization signal, using the first weighted correlation power.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "array" refers to an ordered set of numbers regardless of how stored (e.g., whether stored in consecutive memory locations, or in a linked list). As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity. As used herein, for any two quantities A and B, the "ratio of A to B" means A divided by B.

The term "processing circuit" or "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for new radio sidelink synchronization symbol detection have been specifically described and illustrated herein, many modifications and variations will be apparent to those skilled in the art. Accordingly, it is to be understood that a system and method for new radio sidelink synchronization symbol detection constructed according to principles of this disclosure may be embodied other than as specifically described herein. The invention is also defined in the following claims, and equivalents thereof.

What is claimed is:

1. A method, comprising:
    calculating a first delay compensated input signal, the first delay compensated input signal being based on:
        an input signal; and
        an index of a first tap value;
    calculating a first correlation value, the first correlation value being based on:
        a first candidate sequence, and
        the first delay compensated input signal;
    calculating a first correlation power, the first correlation power being based on the first correlation value;
    calculating a first weighted correlation power, the first weighted correlation power being based on:
        a first weighting factor, and
        the first correlation power; and
    detecting a synchronization signal, using the first weighted correlation power.

2. The method of claim 1, wherein the first delay compensated input signal is based on a unit magnitude complex function having a phase proportional to:
    time, and
    the index of the first tap value.

3. The method of claim 2, wherein the first delay compensated input signal is proportional to:
    the unit magnitude complex function, and
    the input signal.

4. The method of claim 1, wherein the calculating of the first correlation value comprises calculating a dot product of:
    the first candidate sequence, and
    the first delay compensated input signal.

5. The method of claim 1, wherein the first correlation power is further based on the first tap value.

6. The method of claim 5, wherein the calculating of the first correlation power comprises calculating the square of the magnitude of the sum of the first correlation value and the first tap value.

7. The method of claim 1, further comprising calculating the first weighting factor as the ratio of:
    the squared magnitude of the first tap value, to
    the sum of:
        the squared magnitude of the first tap value, and
        a noise variance.

8. The method of claim 1, further comprising:
    calculating a second delay compensated input signal, the second delay compensated input signal being based on:
        the input signal; and
        an index of a second tap value;
    calculating a second correlation value, the second correlation value being based on:
        the first candidate sequence, and
        the second delay compensated input signal;
    calculating a second correlation power, the second correlation power being based on the second correlation value; and
    calculating a second weighted correlation power, the second weighted correlation power being based on:
        a second weighting factor, and
        the second correlation power.

9. The method of claim 8, wherein:
the first tap value is greater in magnitude than a third tap value, and
the second tap value is greater in magnitude than the third tap value.

10. The method of claim 1, wherein the first candidate sequence is a new radio sidelink secondary synchronization signal.

11. The method of claim 1, further comprising calculating the input signal, the calculating of the input signal comprising calculating a coherent combination of two sidelink secondary synchronization signals.

12. A user device, comprising a processing circuit, the processing circuit being configured to:
calculate a first delay compensated input signal, the first delay compensated input signal being based on:
an input signal; and
an index of a first tap value;
calculate a first correlation value, the first correlation value being based on:
a first candidate sequence, and
the first delay compensated input signal;
calculate a first correlation power, the first correlation power being based on the first correlation value;
calculate a first weighted correlation power, the first weighted correlation power being based on:
a first weighting factor, and
the first correlation power; and
detect a synchronization signal, using the first weighted correlation power.

13. The user device of claim 12, wherein the first delay compensated input signal is based on a unit magnitude complex function having a phase proportional to:
time, and
the index of the first tap value.

14. The user device of claim 13, wherein the first delay compensated input signal is proportional to:
the unit magnitude complex function, and
the input signal.

15. The user device of claim 12, wherein the calculating of the first correlation value comprises calculating a dot product of:
the first candidate sequence, and
the first delay compensated input signal.

16. The user device of claim 12, wherein the first correlation power is further based on the first tap value.

17. The user device of claim 16, wherein the calculating of the first correlation power comprises calculating the square of the magnitude of the sum of the first correlation value and the first tap value.

18. The user device of claim 12, wherein the first candidate sequence is a new radio sidelink secondary synchronization signal.

19. The user device of claim 12, wherein the processing circuit is further configured to calculate the input signal, the calculating of the input signal comprising calculating a coherent combination of two sidelink secondary synchronization signals.

20. A system, the system comprising:
a processor; and
a memory storing instructions that, when executed by the processor, cause the processor to:
calculate a first delay compensated input signal, the first delay compensated input signal being based on:
an input signal; and
an index of a first tap value;
calculate a first correlation value, the first correlation value being based on:
a first candidate sequence, and
the first delay compensated input signal;
calculate a first correlation power, the first correlation power being based on the first correlation value;
calculate a first weighted correlation power, the first weighted correlation power being based on:
a first weighting factor, and
the first correlation power; and
detect a synchronization signal, using the first weighted correlation power.

* * * * *